United States Patent
Wienands et al.

(10) Patent No.: US 8,850,353 B2
(45) Date of Patent: Sep. 30, 2014

(54) METHOD AND SYSTEM FOR OVERLAYING SPACE-CONSTRAINED DISPLAY WITH A REFERENCE PATTERN DURING DOCUMENT SCROLLING OPERATIONS

(75) Inventors: Christoph Wienands, Portsmouth, NH (US); Christoph Kuhmuench, Monmouth Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 498 days.

(21) Appl. No.: 12/854,926

(22) Filed: Aug. 12, 2010

(65) Prior Publication Data

US 2011/0047504 A1 Feb. 24, 2011

Related U.S. Application Data

(60) Provisional application No. 61/234,760, filed on Aug. 18, 2009.

(51) Int. Cl.
*G06F 3/048* (2013.01)
*G06F 3/0485* (2013.01)

(52) U.S. Cl.
CPC .................................. *G06F 3/0485* (2013.01)
USPC ....................................................... 715/786

(58) Field of Classification Search
CPC ................................................... G06F 3/0485
USPC ........................................................... 715/786
See application file for complete search history.

(56) References Cited

U.S. PATENT DOCUMENTS

| | | | | |
|---|---|---|---|---|
| 5,748,185 A | * | 5/1998 | Stephan et al. | 345/173 |
| 6,476,831 B1 | * | 11/2002 | Wirth et al. | 715/784 |
| 7,072,515 B2 | * | 7/2006 | Al-Kofahi et al. | 382/199 |
| 7,184,064 B2 | | 2/2007 | Zimmerman et al. | |
| 8,120,623 B2 | * | 2/2012 | Lee et al. | 345/639 |
| 8,300,880 B2 | * | 10/2012 | Esmaili et al. | 382/100 |
| 2002/0168110 A1 | * | 11/2002 | Al-Kofahi et al. | 382/199 |
| 2005/0068290 A1 | * | 3/2005 | Jaeger | 345/156 |
| 2008/0155462 A1 | * | 6/2008 | Nilakantan et al. | 715/786 |
| 2009/0033680 A1 | * | 2/2009 | Lee et al. | 345/629 |
| 2009/0160794 A1 | | 6/2009 | Lee et al. | |
| 2010/0208937 A1 | * | 8/2010 | Kmiecik et al. | 382/100 |
| 2011/0047504 A1 | * | 2/2011 | Wienands et al. | 715/786 |

* cited by examiner

*Primary Examiner* — William Bashore
*Assistant Examiner* — Henry Orr

(57) ABSTRACT

A reading aid is provided for large documents or images on space-constrained touch-sensitive screens of devices, such as mobile phones and personal digital assistants (PDAs). A visual scrolling reference pattern such as a grid is projected over a document during scrolling operations on a touch screen. The scrolling reference pattern correlates information presented in different parts of large documents that are not visible at the same time.

21 Claims, 5 Drawing Sheets

FIG. 1
*Prior Art*

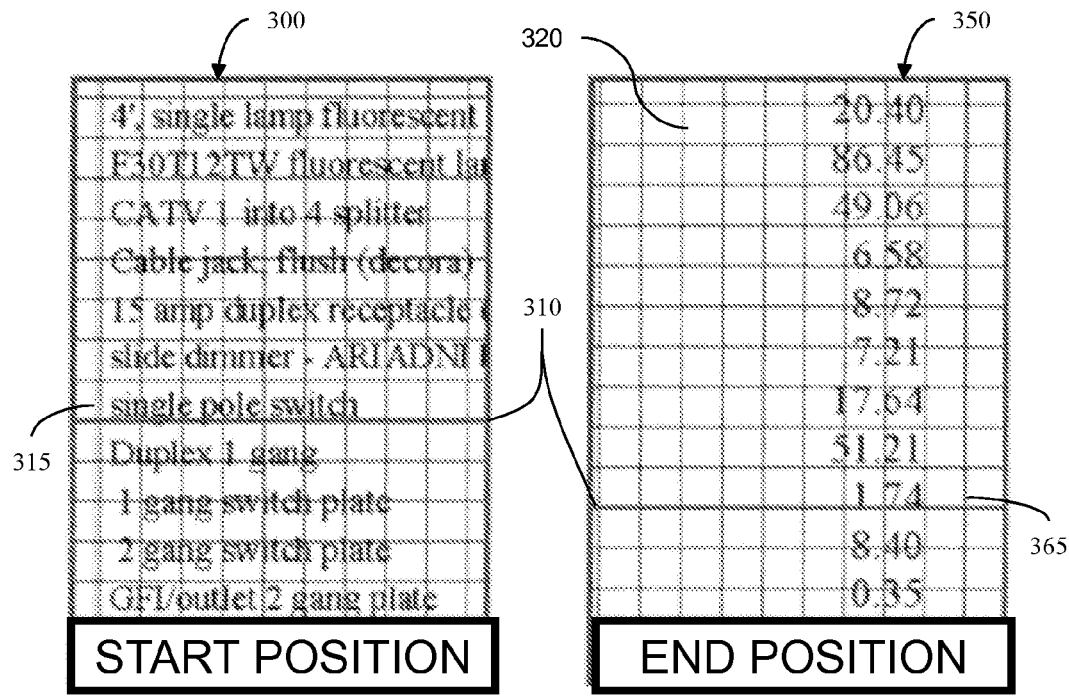
*FIG. 3*
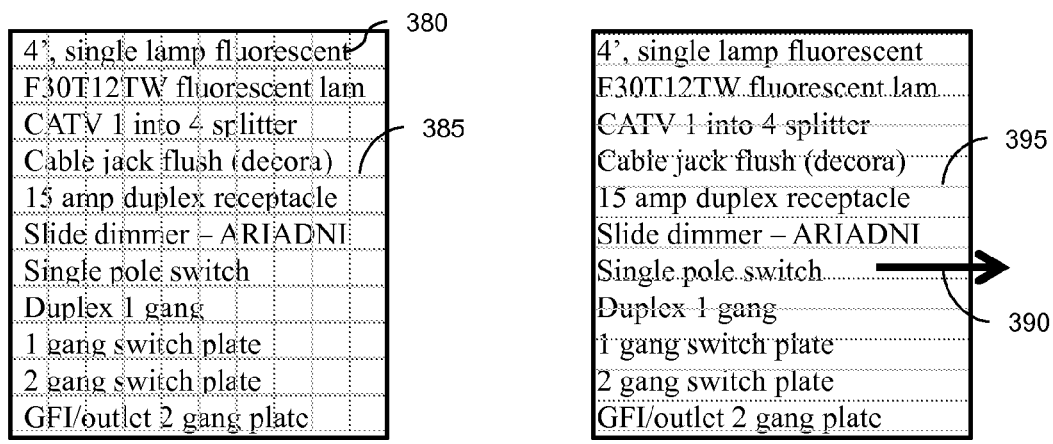
*FIG. 3a*  *FIG. 3b*

METHOD AND SYSTEM FOR OVERLAYING SPACE-CONSTRAINED DISPLAY WITH A REFERENCE PATTERN DURING DOCUMENT SCROLLING OPERATIONS

CROSS REFERENCE TO RELATED APPLICATIONS

This application claims the benefit of U.S. Provisional Application Ser. No. 61/234,760 entitled "Method and System for Overlaying Space-Constrained Touch Screen Display with Grid during Document Scrolling Operations," filed on Aug. 18, 2009, the contents of which are hereby incorporated by reference herein in their entirety.

FIELD OF THE INVENTION

The present invention relates generally to the display of large documents on space-constrained display screens of devices, and more particularly to techniques for scrolling through such documents using those devices. The invention may be used in handheld computing devices, including mobile phones, personal digital assistance (PDAs), portable MP3 players, GPS navigation devices, etc.

BACKGROUND OF THE INVENTION

When using devices with space-constrained touch-sensitive screens, users must often comprehend the content of large documents when only a small part of the document can be seen at one time. When correlated information is distributed either horizontally or vertically in such a document, as in a spreadsheet or a table, a user must scroll from left to right or from top to bottom, while viewing only parts of a row or a column at a time. Without any form of guidance or reference points, it is difficult for a user to comprehend relationships within information that is spatially separated in the document.

FIG. 1 illustrates a large document 101 with a table 100, where correlated information is shown on each line. The table is viewed using a viewport that is large enough to view only a portion of the table 100 at a time. To use the table, a user must know the relationship of data at either end of the lines. For example, to find out the total price 125 of a single pole switch 120, a user must scroll all the way from a start position viewport 105 including the item description column to an end position viewport 110 including the total price column. The inaccuracy of the scrolling operation from left to right causes the viewport 110 to follow a circuitous route 131 across the table 100. Scrolling is adversely affected by error introduced by using fingers on a touch screen, by accidental vertical scrolling movements of the visible area (the "viewport" 105, 110) and by a lack of reference points in certain areas of the document, such as area 127. The result is that it is not clear to the user which one of the displayed prices correlates to the single pole switch. This decreases usability, requires more time to comprehend information and increases the chance of error.

One approach used in solving this problem is to restrict the scrolling direction to either horizontal or vertical movement. Such an approach is implemented, for example, on Apple's iPhone. When the user begins a scrolling operation by tapping the touch screen and moving it, the system determines the main direction of scrolling. Once the main direction of scrolling is determined, the device will limit movement of the viewport to that direction and prevent accidental movement perpendicular to the main scrolling direction.

There is presently a need to overcome the above-described limitations of existing scrolling techniques for viewing large documents on space-constrained touch-sensitive screens.

SUMMARY OF THE INVENTION

The present invention addresses the needs described above by providing a method for displaying a document in a viewport display area of a display screen, the viewport being smaller than the document. On the display screen, a first portion of the document is displayed in the viewport. In a processor connected for driving the display screen, a user command is received to perform a scrolling operation on the document to display a second portion of the document within the viewport. A scrolling reference pattern is displayed superimposed on the document. The scrolling operation to display the second portion of the document within the viewport is performed. During the scrolling operation, the scrolling reference pattern is displayed in a constant position with reference to the document, whereby the scrolling reference pattern moves with the document.

The scrolling reference pattern may be a grid comprising horizontal and vertical lines, or a grid comprising spaced indicia such as dots. The scrolling reference pattern may be semitransparent, whereby the document is visible through solid elements of the reference pattern.

The method may additionally include determining, in the processor, that no user command to perform a scrolling operation has been received for a predetermined amount of time, and after the determining, removing the scrolling reference pattern from the viewport by gradually fading.

The user command to perform a scrolling operation may include a command to perform a scrolling operation primarily in one of a horizontal direction and a vertical direction, in which case the scrolling reference pattern comprises parallel lines extending only in the direction in which the scrolling operation is primarily performed.

Receiving a user command to perform a scrolling operation may include detecting a touch screen input.

The method may also include receiving, in the processor, a user command to perform a zoom operation on the document portion within the viewport, performing the zoom operation, and during the zoom operation, zooming the scrolling reference pattern to maintain a constant size of the scrolling reference pattern with reference to the document.

The method may also include detecting a spacing of elements within the document, and configuring a spacing of the scrolling reference pattern based on the spacing of elements within the document. The method may comprise detecting a color of elements within the document, and coloring the scrolling reference pattern based on the color of elements within the document.

In another embodiment of the invention, a non-transitory computer-usable medium has computer readable instructions stored thereon for execution by a processor to perform a method as described above.

BRIEF DESCRIPTION OF THE DRAWINGS

FIG. 1 is a schematic representation of a large document illustrating a prior art technique for scrolling.

FIGS. 3, 3a and 3b are representations of viewports showing a document, according to embodiments of the invention.

DESCRIPTION OF THE INVENTION

Figure 2:
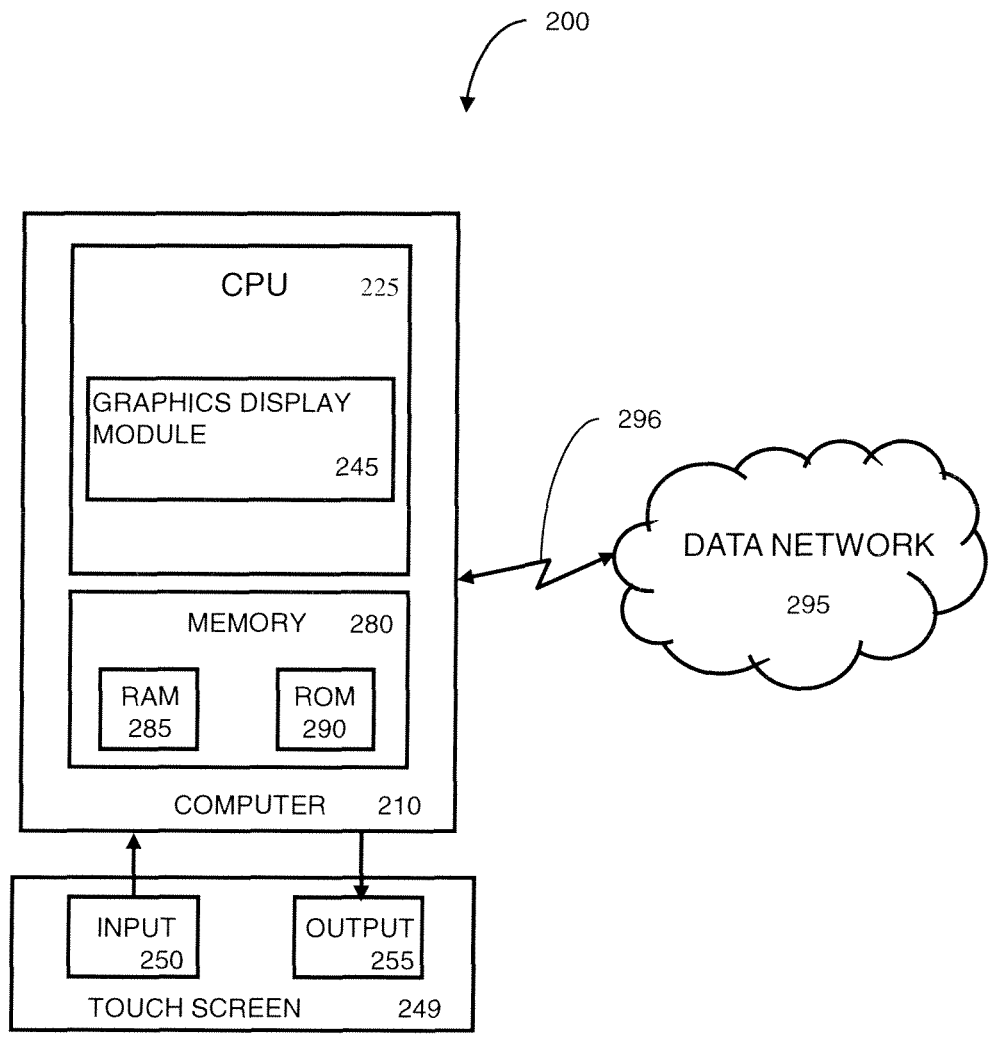
FIG. 2 is schematic illustration of a computer system for executing a method in accordance with the invention.

A computer system 200 for overlaying a space-constrained display with a scrolling reference pattern during document scrolling operations, according to an exemplary embodiment of the present invention, is illustrated in FIG. 2. In the system 200, a computer 210 performs steps of the disclosed method. While a single computer 210 is shown, one skilled in the art will recognize that the disclosed steps may be performed by a plurality of computers linked by a network or a bus.

The computer 210 may be a portable handheld device such as a personal digital assistant (PDA), a cellular telephone, a GPS navigation device, a music/video file player or any combination of those devices. The computer may alternatively be a desktop or laptop computer or any other device that includes a display having a limited viewing area. A "limited viewing area," as used herein, is a viewing area that is not capable of displaying most or all of a page or a document in a readable manner. For example, a viewing area that is not capable of displaying in a readable manner all or nearly all of a document page having a 10-point font is considered a limited viewing area with respect to that document. The computer 210 receives data from any number of data sources that may be connected to the computer, including a data network 295 that may be connected to the computer via a wireless connection 296.

The computer 210 includes a central processing unit (CPU) 225 and a memory 280. The computer 210 is connected to an input device 250 and an output device 255. In the embodiment shown, the input device 250 and the output device 255 are incorporated in a touch screen 249, which simultaneously displays output on a screen and accepts input via finger or stylus contact on the same screen.

The input and output may alternatively be separate devices. For example, the input 250 may be a mouse, network interface, touch screen, etc., and the output 255 may be a liquid crystal display (LCD), cathode ray tube (CRT) display, printer, etc. The computer 210 may be connected to a network, with all commands, input/output and data being passed via the network. The computer 210 can be configured to operate and display information by using, e.g., the input 250 and output 255 devices to execute certain tasks.

The CPU 225 includes one or more graphic display modules 245 that are configured for performing one or more methods for overlaying a scrolling reference pattern as discussed herein.

The memory 280 includes a random access memory (RAM) 285 and a read-only memory (ROM) 290. The memory 280 may also include removable media such as a disk drive, tape drive, memory card, etc., or a combination thereof. The RAM 285 functions as a data memory that stores data used during execution of programs in the CPU 225 and is used as a work area. The ROM 290 functions as a program memory for storing a program executed in the CPU 225. The program may reside on the ROM 290 or on any other nonvolatile computer-usable medium as computer readable instructions stored thereon for execution by the CPU 225 or another processor to perform the methods of the invention. The ROM 290 may also contain data for use by other programs.

The present disclosure presents a novel approach that provides guidance and reference points to assist users of space-constrained touch screens to scroll across a large document. Upon the start of a scrolling operation, the visible area of the document is overlaid by the projection of a scrolling reference pattern such as a grid. The scrolling reference pattern moves in synchronization with the document as it is scrolled by the user. The reference pattern, as it synchronously moves with the scrolled document, serves as an easy-to-understand reference point throughout the scroll operation.

In a preferred embodiment, the scrolling reference pattern is projected on the document in response to the initiation of a scrolling operation by the user. For example, the user may move a finger across a touch screen, roll a track ball or move a mouse to initiate scrolling. Those actions may initiate scrolling only in certain program states. In the present disclosure, a "user command to perform a scrolling operation" is understood to mean an action like those above, taken by a user when the program state causes the processor to interpret that action as a scroll command.

Figure 1:
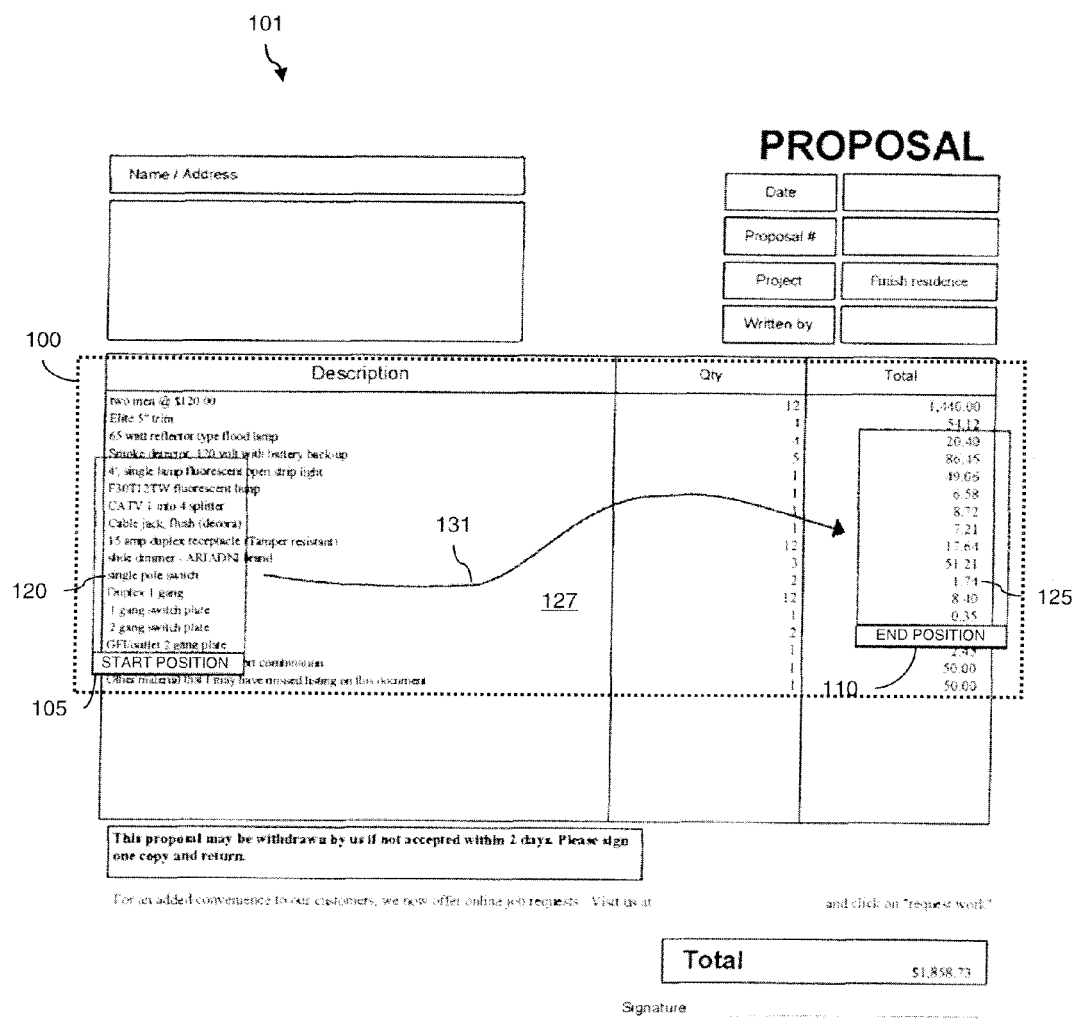

FIG. 3 shows viewports 300, 350 corresponding to the viewports 105, 110 from the previous example (FIG. 1), with viewport 300 showing a start position of a generally horizontal scrolling operation and viewport 350 showing an end position. The viewports 300, 350 include a grid 320 projected on the document. The grid is shown in both viewports. One of the grid lines 310 has been highlighted in both viewports to show how users can use the grid to correlate information during the scrolling operation. While the exemplary scrolling reference pattern is a grid of lines, other characters or discrete indicia may be arranged in a grid for use as a scrolling reference pattern, such as dots, x's, crosses or asterisks. Each character or object in the pattern indicates a fixed location on a document.

Preliminary experiments have shown that a human eye can easily focus and follow a particular grid line during a scrolling operation. In the example shown in FIG. 3, the highlighted grid line 310 is immediately beneath the text of interest 315 (the item "single pole switch") in the start position view port 300. As the user scrolls to the right, some vertical scrolling also takes place due to the inherent inaccuracies of the interface and the user's input. The vertical scrolling moves the highlighted grid line 310 downward in the end position viewport 350 as compared to the start position viewport 300. The user is able to follow that particular grid line 310 during the scroll operation to easily correlate the data of interest 365 (the number "1.74") to the text 315 on the same line. The grid lines provide guidance for scrolling in blank areas of the displayed page such as area 127 (FIG. 1) where no other reference is available The scrolling reference pattern may be formed of semi-transparent solid elements (such as lines, dots or other indicia) that reveal the displayed page beneath them. The scrolling reference pattern may furthermore comprise elements of a uniform, predetermined color, or the color of reference elements may be chosen at the time of creation for contrast and visibility when superimposed on a particular background document that is being scrolled. The grid color may change with differently colored sections of the background document to assure visibility across a document having variable color.

The spacing of the grid 320 (i.e., the distance between adjacent lines or other indicia) is chosen to provide a convenient number of lines without obscuring the underlying document or overcrowding the display. In the embodiment shown, 13 horizontal lines and 10 vertical lines are used on a PDA screen approximately three inches in height by two inches in width.

In another embodiment, shown in FIG. 3a, the grid spacing is chosen based on the spacing of the displayed items. In one such example, after scrolling is detected, a document image 380 is analyzed and it is determined that a vertical array of displayed items are spaced 5 lines per inch. A horizontal grid 385 of 5 lines per inch is then displayed for scrolling guidance. Similarly, if vertical scrolling is detected, the image is analyzed and columns of data are detected. A vertical line is displayed as a scrolling reference for each column.

The scrolling reference pattern may be a grid displayed in both the vertical and horizontal directions, as shown, or may be displayed only in the direction of scrolling. For example, if horizontal scrolling 390 is detected, as shown in FIG. 3b, then only horizontal lines 395 may be displayed. The scrolling reference pattern may comprise a grid of uniform lines, or may include heavier weight lines in even increments to demarcate a number of lines such as 5 lines, 12 lines, etc.

Figure 4:
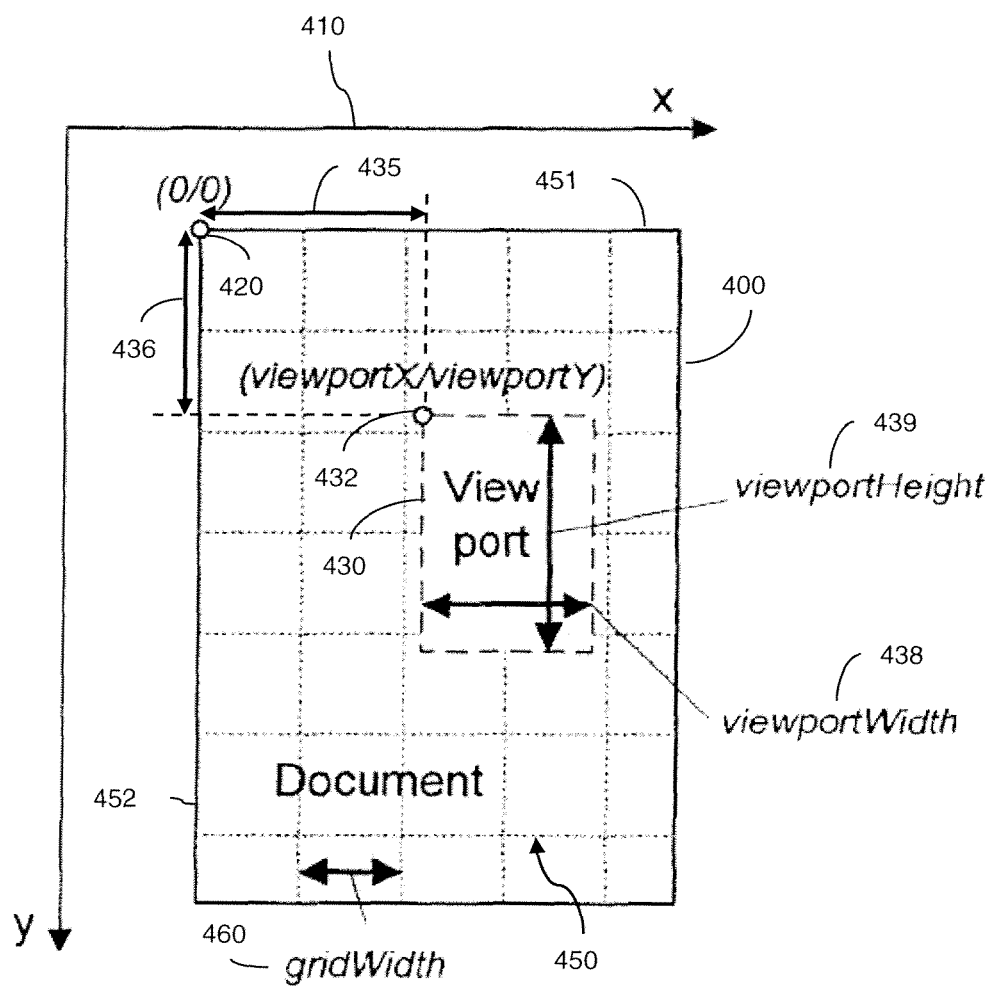
FIG. 4 is a schematic diagram illustrating a document, a viewport and a scrolling reference pattern according to one embodiment of the invention.

A simple algorithm may be used to draw a scrolling reference pattern grid based on the concept of a virtual viewport that shows a section of a larger document. For that purpose, the document or image is regarded as a two-dimensional raster image 400 in a Cartesian coordinate system 410, as shown in FIG. 4. One corner 420 of the document 400 coincides with the origin (0/0) of the coordinate system. In the example shown, the origin is in the top left corner, which is consistent with a coordinate system for computer displays. Therefore, the top left corner 432 of the viewport 430 (i.e., the top left corner of the area visible on a device screen) can be described by a horizontal coordinate 435 and a vertical coordinate 436 (viewporX/viewportY). The viewport has a width 438 viewportWidth) and a height 439 (viewportHeight) and has an area of viewportWidth times viewportHeight pixels.

Also shown is a scrolling reference pattern in the form of a grid projection 450 in which both a horizontal line 451 and a vertical line 452 go through they origin 420 (0/0). From the origin 420 parallel lines are projected across the document, which are evenly spaced by a spacing 460 (gridWidth) in pixels.

A sample algorithm used to draw the part of the grid shown in FIG. 4 that is visible in the viewport is presented below. While any number of techniques may be used to generate the visible grid, the following is provided as an example:

```
var gridOffsetX = gridWidth - (viewportX mod gridWidth)
While gridOffsetX < viewportWidth
    DrawLine(gridOffsetX, 0, gridOffsetX, viewportHeight-1)
    gridOffsetX = gridOffsetX + gridWidth
End While
var gridOffsetY = gridWidth - (viewportY mod gridWidth)
While gridOffsetY < viewportHeight
    DrawLine(O, gridOffsetY, viewportWidth - 1, gridOffsetY)
    gridOffsetY = gridOffsetY + gridWidth
End While
```

When a user scrolls the viewport across the document (which translates to changes in the viewportX and viewportY coordinates), the user will get the impression that the grid moves in lockstep with the underlying document.

The above algorithm may be extended to accommodate a zoom factor by which the document at hand is zoomed in the viewport. For example, when a zoom command is received from a user, the viewportX, viewportY parameters may be adjusted to accommodate a new location of the viewport, and the viewportHeight, viewportWidth and gridWidth parameters may be scaled to the new zoom factor. If a zoom is performed before scrolling, the gridWidth parameter may be varied to provide an optimal number of grid lines in the viewport.

The superimposing of the scrolling reference pattern may be automatic upon detection of a scrolling input by a user. Alternatively, the grid may be turned on manually by the user in anticipation of a scrolling operation.

In one embodiment, a fade-out feature is provided for the scrolling reference pattern, whereby, once the scrolling operation stops, the grid fades (become less and less visible) over a period of time until it is no longer visible. For example, if no scrolling command is received for a predetermined period of time, it is presumed that scrolling is over and the scrolling reference pattern begins to fade. A fade-out period of one second has been found to improve usability during scrolling operations while preventing the scrolling reference pattern from disappearing too quickly when the user lifts a finger from the touch-sensitive screen in order to initiate the next scrolling movement.

Figure 5:
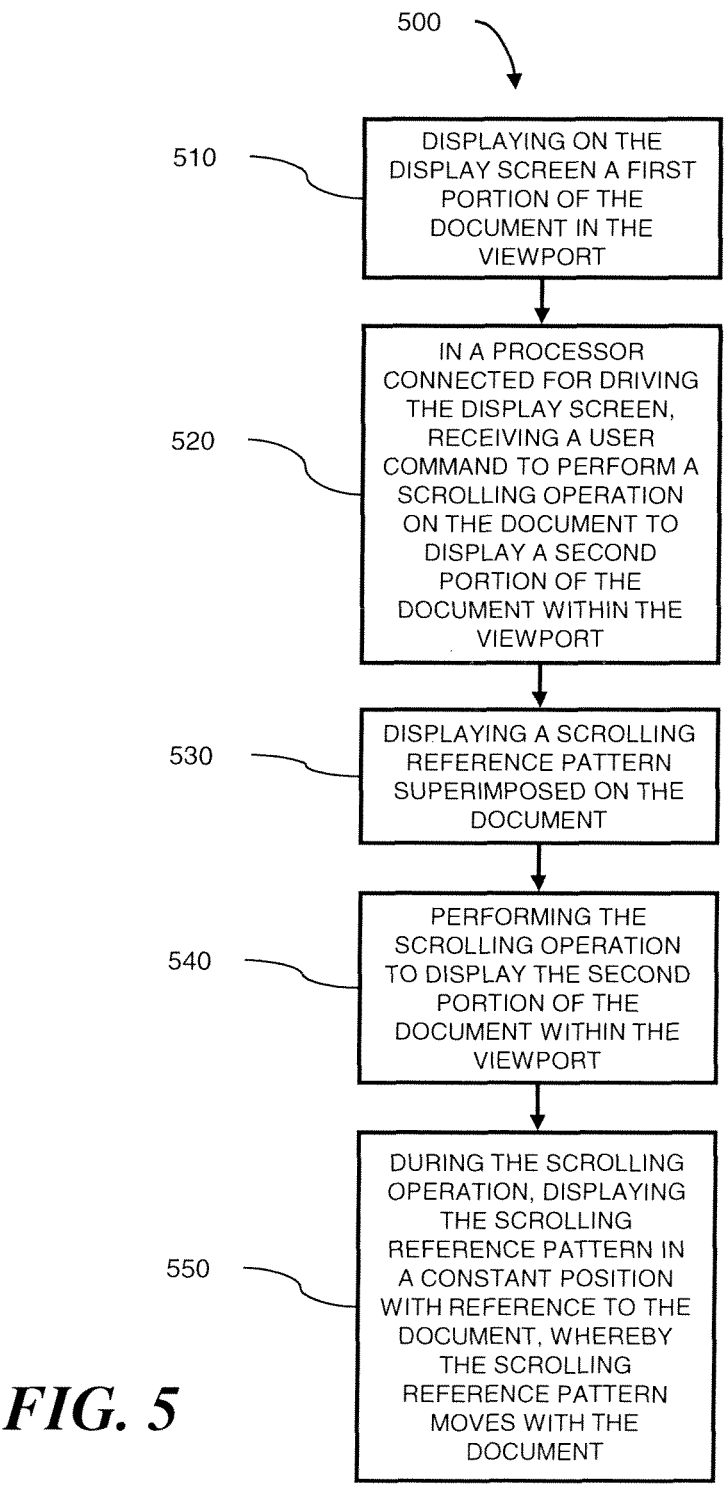
FIG. 5 is a flow chart showing a method according to one embodiment of the invention.

A method 500 in accordance with one embodiment of the invention is represented by the flow chart of FIG. 5. The method displays a document in a viewport display area of a display screen, where the viewport is smaller than the document, the method comprising:

A first portion of the document is displayed 510 on the display screen in the viewport. For example, the viewport 300 of FIG. 3 shows a start position of a document. In a processor connected for driving the display screen, a user command is received 520 to perform a scrolling operation on the document to display a second portion of the document within the viewport. The user command may, for example, be the movement of a finger across a touch screen while the display program is in a proper state.

A scrolling reference pattern is displayed 530 superimposed on the document. The reference pattern may, for example, be a grid including horizontal and vertical lines, or may include only parallel lines extending in the direction of scrolling.

The scrolling operation is then performed 540 to display the second portion of the document within the viewport. During the scrolling operation, the scrolling reference pattern is displayed 550 in a constant position with reference to the document, whereby the scrolling reference pattern moves with the document.

In summary, the presently described methods and systems improve the usability of space-constrained screens of computing devices. A scrolling reference pattern is projected during scroll operations to provide reference points for a user viewing a large document on a small screen, even in areas where the document itself does not provide any reference points. A user can scroll through large blank spaces without losing track of the viewport location in the document. A user can thereby more easily correlate information located in different parts of a document that cannot be displayed at the same time.

The technique can be applied alone or can be combined with direction-restricted scrolling. In either case, the technique improves a user's ability to correlate information in a large document viewed on a small screen.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the techniques described herein are described as applied to a large table or spreadsheet, the techniques may similarly be applied to any large document viewed on a comparatively small screen, such as a map, a calendar or a schematic drawing, while remaining within the scope of the invention. In another example, while the present disclosure uses a PDA as an example of a device having a small viewing area, the techniques may be applied to any viewing area that is comparatively small with respect to the viewed document, such as a small window on a larger screen of a desktop computer, etc. It is to be understood that the embodiments shown and described herein are only illustrative of the principles of the present invention and that various modifications may be implemented by those skilled in the art without departing from the scope and spirit of the invention.

What is claimed is:

1. A method for displaying a document in a viewport display area of a display screen, the viewport being smaller than the document,) the method comprising:
    displaying on the display screen a first portion of the document in the viewport;
    in a processor connected for driving the display screen, while the first portion of the document is displayed in the viewport, receiving a user command to initiate a scrolling operation on the document to display a second portion of the document within the viewport;
    in response to receiving the user command to initiate the scrolling operation, displaying a scrolling reference pattern superimposed on the first portion of the document;
    performing the scrolling operation to display the second portion of the document within the viewport;
    and during the scrolling operation, displaying the scrolling reference pattern in a constant position with reference to the document, whereby the scrolling reference pattern moves with the document
    wherein the scrolling operation is in a direction of scrolling, and the scrolling reference pattern contains only lines in the direction of scrolling.

2. The method of claim 1, wherein the scrolling reference pattern is a grid comprising horizontal and vertical lines.

3. The method of claim 1, wherein the scrolling reference pattern is a pattern of discrete indicia arranged in a grid.

4. The method of claim 1, wherein the scrolling reference pattern is semitransparent, whereby the document is visible through solid elements of the reference pattern.

5. The method of claim 1, further comprising:
    in the processor, determining that no user command to perform a scrolling operation has been received for a predetermined amount of time; and
    after the determining, removing the scrolling reference pattern from the viewport by gradually fading.

6. The method of claim 1, wherein receiving a user command to initiate a scrolling operation further comprises detecting a touch screen input.

7. The method of claim 1, further comprising:
    in the processor, receiving a user command to perform a zoom operation on the document portion within the viewport;
    performing the zoom operation; and
    during the zoom operation, zooming the scrolling reference pattern to maintain a constant size of the scrolling reference pattern with reference to the document.

8. The method of claim 1, further comprising:
    detecting a spacing between a plurality of elements within the document by analyzing a displayed image of the document; and
    configuring a spacing of the scrolling reference pattern based on the spacing of elements within the document.

9. The method of claim 1, further comprising:
    detecting a color of elements within the document; and
    coloring the scrolling reference pattern based on the color of elements within the document.

10. A non-transitory computer-usable medium having computer readable instructions stored thereon for execution by a processor to perform a method for displaying a document in a viewport display area of a display screen, the viewport being smaller than the document, the method comprising:
    displaying on the display screen a first portion of the document in the viewport;
    in a processor connected for driving the display screen, while the first portion of the document is displayed in the viewport, receiving a user command to initiate a scrolling operation on the document to display a second portion of the document within the viewport;
    in response to receiving the user command to initiate the scrolling operation, displaying a scrolling reference pattern superimposed on the first portion of the document;
    performing the scrolling operation to display the second portion of the document within the viewport; and
    during the scrolling operation, displaying the scrolling reference pattern in a constant position with reference to the document, whereby the scrolling reference pattern moves with the document
    wherein the scrolling operation is in a direction of scrolling, and the scrolling reference pattern contains only lines in the direction of scrolling.

11. The non-transitory computer-usable medium of claim 10, wherein the scrolling reference pattern is a grid comprising horizontal and vertical lines.

12. The non-transitory computer-usable medium of claim 10, wherein the scrolling reference pattern is a pattern of discrete indicia arranged in a grid.

13. The non-transitory computer-usable medium of claim 10, wherein the scrolling reference pattern is semitransparent, whereby the document is visible through solid elements of the reference pattern.

14. The non-transitory computer-usable medium of claim 10, wherein the method further comprises:
    in the processor, determining that no user command to perform a scrolling operation has been received for a predetermined amount of time; and
    after the determining, removing the scrolling reference pattern from the viewport by gradually fading.

15. The non-transitory computer-usable medium of claim 10, wherein receiving a user command to initiate a scrolling operation further comprises detecting a touch screen input.

16. The non-transitory computer-usable medium of claim 10, wherein the method further comprises:
    in the processor, receiving a user command to perform a zoom operation on the document portion within the viewport;
    performing the zoom operation; and
    during the zoom operation, zooming the scrolling reference pattern to maintain a constant size of the scrolling reference pattern with reference to the document.

17. The non-transitory computer-usable medium of claim 10, wherein the method further comprises:
    detecting a spacing between a plurality of elements within the document by analyzing a displayed image of the document; and
    configuring a spacing of the scrolling reference pattern based on the spacing of elements within the document.

18. The non-transitory computer-usable medium of claim 10, wherein the method further comprises:
    detecting a color of elements within the document; and coloring the scrolling reference pattern based on the color of elements within the document.

19. The method of claim 8, wherein the document comprises lines or columns of data, and the detecting the spacing of elements further comprises detecting a spacing of the lines or columns of data.

20. The non-transitory computer-usable medium of claim 17, wherein the document comprises lines or columns of data, and the detecting the spacing of elements further comprises detecting a spacing of the lines or columns of data.

21. A method for displaying a document in a viewport display area of a display screen, the viewport being smaller than the document, the method comprising:

displaying on the display screen a first portion of the document in the viewport;

in a processor connected for driving the display screen, while the first portion of the document is displayed in the viewport, receiving a first user command to initiate a substantially horizontal scrolling operation on the document to display a second portion of the document within the viewport;

in response to receiving the user command to initiate the substantially horizontal scrolling operation, displaying a first scrolling reference pattern comprising only horizontal lines superimposed on the first portion of the document;

performing the scrolling operation to display the second portion of the document within the viewport;

during the scrolling operation, displaying the first scrolling reference pattern in a constant position with reference to the document, whereby the first scrolling reference pattern moves with the document;

removing the first scrolling reference pattern from the viewport;

receiving a second user command to initiate a substantially vertical scrolling operation on the document to display a third portion of the document within the viewport;

in response to receiving the user command to initiate the substantially vertical scrolling operation, displaying a second scrolling reference pattern comprising only vertical lines superimposed on the document;

performing the scrolling operation to display the third portion of the document within the viewport; and during the scrolling operation, displaying the second scrolling reference pattern in a constant position with reference to the document, whereby the second scrolling reference pattern moves with the document.

\* \* \* \* \*